Patented July 24, 1934

1,967,639

UNITED STATES PATENT OFFICE 1,967,639

LATEX ADHESIVE

Walter H. Wedger, Belmont, Mass., assignor to Boston Blacking Chemical Co., Boston, Mass., a corporation of Massachusetts No Drawing. Application May 8, 1931, Serial No. 536,069

11 Claims. (Cl. 134—17)

This invention relates to improvements in the compounding and stabilizing of latex.

It has been usual practice for a number of years to use in the manufacture of boots and shoes water-dispersed rubber cements, commonly spoken of as latex adhesives, having as a principal constituent the natural latex of *Hevea brasiliensis*, or occasionally an artificial water dispersion of rubber. Such adhesives have been rendered alkaline, usually by the addition of ammonia, in order to prevent coagulation of the rubber particles, and various other substances, usually in a colloidal or at least in a finely dispersed condition, have been added, to give the adhesives "body" while in the liquid condition, to impart tack, and to help in the stabilization of the latex, that is, to inhibit coagulation.

While such adhesives have given a considerable degree of satisfaction and have been used to a large extent, there has been difficulty at times due to coagulation of the rubber particles, resulting probably from aging under adverse temperature conditions, aided also by the agitation incident to the handling and shipping of the adhesive and from bacterial action, pollution, and the evaporation of the ammonia. This coagulation has happened with sufficient frequency to present a real problem. Occasionally large chunks of rubber have been found in the freshly opened cans of latex adhesives. More often there have been clots or strings, sometimes even ropes, of rubber found upon opening such cans. These were cases, of course, in which the rubber particles appeared to be thoroughly dispersed, substantially as thoroughly as in the original natural latex, at the time when the adhesive was compounded and packed.

In view of the foregoing, objects of the present invention are to provide improved latex compositions and certain improvements in methods of treating and compounding latex.

Heretofore natural and artificial latices have been compounded with various protective colloids, notably bentonite. When forming an adhesive of this kind from natural Hevea latex it has been usual to form a colloidal solution of the bentonite or other substance which is then added to the slightly alkaline latex and the two thoroughly mixed. This requires a relatively large proportion of the protective colloid, probably since a large portion of the particles of the latter are out of contact with the rubber particles and therefore are useless. In a dispersion compounded in this fashion both the rubber particles and the particles of the protecting colloid are, it is believed, distributed substantially uniformly throughout the continuous phase. It is probable, however, that it is only such of the particles of the protective colloid as actually contact with the rubber particles that are effective. If all or substantially all of the protecting particles could be brought into contact with the dispersed rubber particles, the effectiveness of the protecting particles would be greatly increased and a correspondingly smaller amount of the protecting colloid would be sufficient. The absence, moreover, of the ineffective particles would naturally be expected to improve the adhesive properties of the compound.

Working upon this theory, I propose to form the protecting particles in the latex itself under conditions such that the protecting particles are adsorbed on or deposited as an exceedingly fine precipitate on the surface of the rubber particles. I have found that this can be done effectively, for example by adding an ammonia-cut casein solution to ammonia-preserved latex and then adding formaldehyde. The formaldehyde reacts first with the casein, forming a casein-formaldehyde condensation product which is deposited in the form of a very finely divided precipitate on the surface of the rubber particles. If an excess of formaldehyde is added it will, of course, react with the ammonia, forming hexamethylenetetramine.

Since hexamethylenetetramine is inert with respect to the other ingredients used, the last-mentioned reaction may, in accordance with another aspect of the invention, advantageously be utilized to rid the latex of the ammonia smell. In order to maintain a suitable degree of alkalinity (a pH of about 8 to 8.5 or, in some instances, higher, is desirable), before adding the formaldehyde a sufficient amount of an ethanolamine which is substantially non-volatile is added so that after the ammonia odor has been killed by the formaldehyde the latex will have the desired degree of alkalinity. I have found that pure mono-, di- and tri-ethanolamine, which are all inert to formaldehyde, are all useful for this purpose, and also that the substance obtainable commercially under the name of triethanolamine, which is in fact largely triethanolamine but contains also the mono- and di- compounds, is entirely effective. Other organic amines such as tertiary amines, for example triethylamine, may also be used, though generally speaking they are less desirable from the point of view of cost, and tendency to react with formaldehyde, and some of them are unduly volatile. In this connection it should be understood that this use of the ethanolamines to render latex alkaline is in no way limited to latex protected with the casein-formaldehyde condensation product outlined above.

At this point it may be noted that the amount of formaldehyde to be used is moderately critical. There must be enough formaldehyde added to react with all of the casein and with most of the ammonia. An excess of formaldehyde, on the other hand, is objectionable on account of its odor and on account of its harsh action on the hands of the operators who apply the adhesive.

Other protective substances than the casein-formaldehyde condensation product may be similarly precipitated in the latex in such a manner that they are adsorbed on the surface of the rubber particles. Thus tannic acid may be added to the latex and then, by the addition of ferrous sulphate, precipitated as ferrous tannate which is deposited in an extremely finely divided condition on the surface of the rubber particles. This makes a dark colored latex but where that is unobjectionable it may be used with satisfaction. Calcium tennate may be precipitated in a similar fashion, producing a substantially white adhesive which is highly stable.

In order to obtain different degrees of tackiness and viscosity to adapt the latex adhesives for use under different conditions, ingredients other than those mentioned above may often be added to advantage. Such materials as karaya gum solutions and ester gum emulsions are particularly useful. Rosin dispersions, rosin oil dispersions, rosin soaps and glycerin are also helpful at times.

I will now describe in detail the preparation of casein-formaldehyde protected latex and the elimination of the ammonia from such latex with formaldehyde in the presence of commercial triethanolamine.

The ammonia-cut casein solution is formed by adding 50 pounds of dry casein to 30 gallons of cold water in a steam-jacketed kettle. This is mixed until the casein is thoroughly wet and then 112 ounces of concentrated ammonia (sp. g. .880) is added. The mixture is then heated with constant agitation to a temperature of 160° F., at which time the casein will be completely dissolved. A suitable preservative (for example one pound of phenol) may be added at this stage. The mixture is allowed to cool, with frequent stirring to prevent film formation on the surface, and when cooled is made up to 50 gallons with cold water.

Latex concentrated to have approximately a 60 per cent. solid rubber content is imported into this country from the rubber plantations of the East and is readily available. From this a stock latex is prepared having an actual 50 per cent. rubber content. To 83 gallons and 84 fluid ounces of this add, with constant agitation, 12 gallons and 84 fluid ounces of the previously described ammonia-cut casein solution, the addition of the ammonia-cut casein being extended over about a five minute interval. When thoroughly mixed, add 1 gallon 126 fluid ounces of commercial triethanolamine, with continued stirring. After the mixture has been stirred for ten minutes, add very slowly, with gentle stirring, 1 gallon 126 fluid ounces of a 40 percent. formaldehyde solution. This addition should be extended over about a five minute period. Then stir gently for half an hour. This mixture will still smell of ammonia. The amount of formaldehyde which has been added is sufficient to react completely with the casein present (forming, as pointed out above, a casein-formaldehyde condensation product which is apparently adsorbed on the rubber particles or deposited on them as a coating made up of an extremely finely divided precipitate) and to react with a considerable proportion, but preferably not with all, of the ammonia.

The amount of casein-formaldehyde condensation product provided is not critical. The quantity recited in this paragraph is undoubtedly a number of times the minimum which may be used effectively, and is insufficient in amount to mask the property of the rubber particles of drying to films which will adhere to each other and insufficient in amount to prevent the rubber deposited from the latex from exhibiting essentially its normal adhesive characteristics. The excess of the condensation product, beyond that which is deposited on the rubber particles, remains in suspension and seems to increase the body and to reduce the tackiness of the adhesive, but is otherwise inert.

It is desirable, when further compounding is to be done, to retain some of the ammonia in the mixture, it being understood that during the further compounding or shortly before the compound is packed additional formaldehyde may be added, if necessary, to react with any ammonia which has not disappeared, either by evaporation or by combining with other substances, such as rosin, which have been added. If, however, the substance is to be used under conditions, which make the ammonia smell unobjectionable, or if the surplus ammonia has completely disappeared, then the addition of more formaldehyde may be omitted.

In protected latex prepared as described above, the casein-formaldehyde condensation product is about 3 per cent. of the rubber content, though, as pointed out above, this may be reduced materially.

Protected latex, the manufacture of which has just been described is of readily fluent consistency similar to that of untreated latex, and provides a valuable adhesive. For some purposes it may be advantageously diluted; for example, if the latex is to be used in cementing together the lips of leather insoles of the type used in the manufacture of Goodyear welt shoes, it may be diluted by adding three parts of the protected latex to one part of water and agitating for a few minutes.

Examples of other materials which may be deposited on the surface of or adsorbed by the rubber particles of the latex and will thereby protect the latex effectively are ferrous tannate and calcium tannate. Thus protected latex having a dark purplish brown color but effectively protected and useful as an adhesive under circumstances where its color is unobjectionable was made as follows: 200 grams of latex having a 60% rubber content were taken, to which were added 11 grams of powdered rosin and the mixture agitated for a period of 15 minutes. This produced a fairly viscous mass which, however, could still be poured readily. 6 grams of trisodium phosphate were then dissolved in 350 grams of water and in this solution 12 grams of casein were dissolved. After the peptization of the casein was complete this solution was added to the latex containing the rosin. To 100 grams of this product 1cc. of triethanolamine was added, then 1cc. of formaldehyde (the usual 40% solution) and 12cc. of a tannic acid solution containing .09 grams of tannic acid per cc. To this was added 2 cc. of a ferrous sulphate solution containing .05 grams of ferrous sulphate per cc. This gave an adhesive having a pH of about 7, a very stable adhesive and one which will even stand the addition of dilute acids without coagulation. The rubber particles of the latex are protected by ferrous tannate which precipitates out in a colloidal state or as a fine precipitate, and which is apparently adsorbed on the rubber particles, and which, by reason of its resistance to most chemical action, is highly effective as a protecting medium for rubber particles. In this adhesive the casein remains dispersed and does not serve, at least to any substantial extent, as a protecting medium for the rubber particles but does, of course, give body to the adhesive.

A sample of adhesive made up in the same general fashion as the foregoing but with the addition of saturated solution of calcium hydrate in place of the ferrous sulphate was substantially white and had a pH of about 9. Its strength as an adhesive was less than that of the ferrous tannate protected or the casein-formaldehyde protected latices but was sufficient, nevertheless, to make it satisfactory for many purposes. Its viscosity was low relatively to its rubber content, which, of course, is desirable for some purposes. If a higher viscosity is desired this can be easily obtained by raising the rosin or casein contents or both.

Having thus described my invention what I claim as new and desire to secure by Letters Patent of the United States is:

1. A latex composition comprising an aqueous dispersion wherein the disperse phase comprises rubber, the individual particles of which have associated therewith casein-formaldehyde condensation product sufficient in amount substantially to inhibit coagulation of the rubber particles under ordinary conditions of handling and shipping but insufficient in amount to prevent the rubber deposited from the latex from exhibiting essentially its normal adhesive characteristics.

2. A latex composition comprising an aqueous dispersion the alkalinity of which is maintained by an organic amine and wherein the disperse phase comprises rubber the individual particles of which have associated therewith casein-formaldehyde condensation product sufficient in amount substantially to inhibit coagulation of the rubber particles under ordinary conditions of handling and shipping but insufficient in amount to prevent the rubber deposited from the latex from exhibiting essentially its normal adhesive characteristics.

3. A latex composition comprising an aqueous dispersion the alkalinity of which is maintained by an ethanolamine and wherein the disperse phase comprises rubber the individual particles of which have associated therewith casein-formaldehyde condensation product sufficient in amount substantially to inhibit coagulation of the rubber particles under ordinary conditions of handling and shipping but insufficient in amount to prevent the rubber deposited from the latex from exhibiting essentially its normal adhesive characteristics.

4. A latex dispersion the rubber particles of which are protected against coagulation under ordinary conditions of handling and shipping by a metallic salt of tannic acid associated with the rubber particles in amount insufficient to mask the property of the rubber deposited from the latex of drying to films which will adhere to each other.

5. A latex composition upon the rubber particles of which is deposited a precipitated proteid substance in amount not greater than about 3% by weight of the rubber content of the latex whereby the rubber particles may exhibit essentially their normal adhesive characteristics.

6. A latex composition with the rubber particles of which is associated a casein-formaldehyde condensation product in amount not more than about 3% by weight of the rubber content of the latex.

7. An improved process of treating latex which comprises adding an organic amine to ammonia-preserved latex and adding sufficient formaldehyde to react with all or most of the ammonia, whereby the alkalinity of the latex is thereafter maintained by the organic amine.

8. An improved process of treating latex which comprises adding an ethanolamine to ammonia-preserved latex and adding sufficient formladehyde to react with all or most of the ammonia, whereby the alkalinity of the latex is thereafter maintained by the ethanolamine.

9. An improved process of treating latex which comprises adding triethanolamine to ammonia-preserved latex and adding sufficient formaldehyde to react with all or most of the ammonia whereby the alkalinity of the latex is thereafter maintained by the triethanolamine.

10. An improved process of compounding latex which comprises intimately associating an ammonia-cut casein solution with ammonia-preserved latex, adding an ethanolamine, and thereafter adding sufficient formaldehyde to form a condensation product with the casein and react with substantially all of the ammonia, whereby the alkalinity of the latex is thereafter maintained by the ethanolamine.

11. A latex dispersion the rubber particles of which are protected against coagulation under ordinary conditions of handling and shipping by material, selected from a group consisting of casein-formaldehyde condensation product and a salt of tannic acid, deposited on the rubber particles insufficient in amount to prevent the rubber deposited from the latex from exhibiting essentially its normal adhesive characteristics.

WALTER H. WEDGER.

CERTIFICATE OF CORRECTION.

Patent No. 1,967,639.

July 24, 1934.

WALTER H. WEDGER.

It is hereby certified that the name of the assignee in the above numbered patent was erroneously described and specified as "Boston Blacking Chemical Co.", whereas said name should have been written and printed as Boston Blacking & Chemical Co., as assignee of the entire interest in said invention as shown by the records of assignments in this office; and that the said Letters Patent should be read with this correction therein that the same may conform to the record of the case in the Patent Office.

Signed and sealed this 11th day of September, A. D. 1934.

Leslie Frazer (Seal)

Acting Commissioner of Patents.